Patented May 6, 1924.

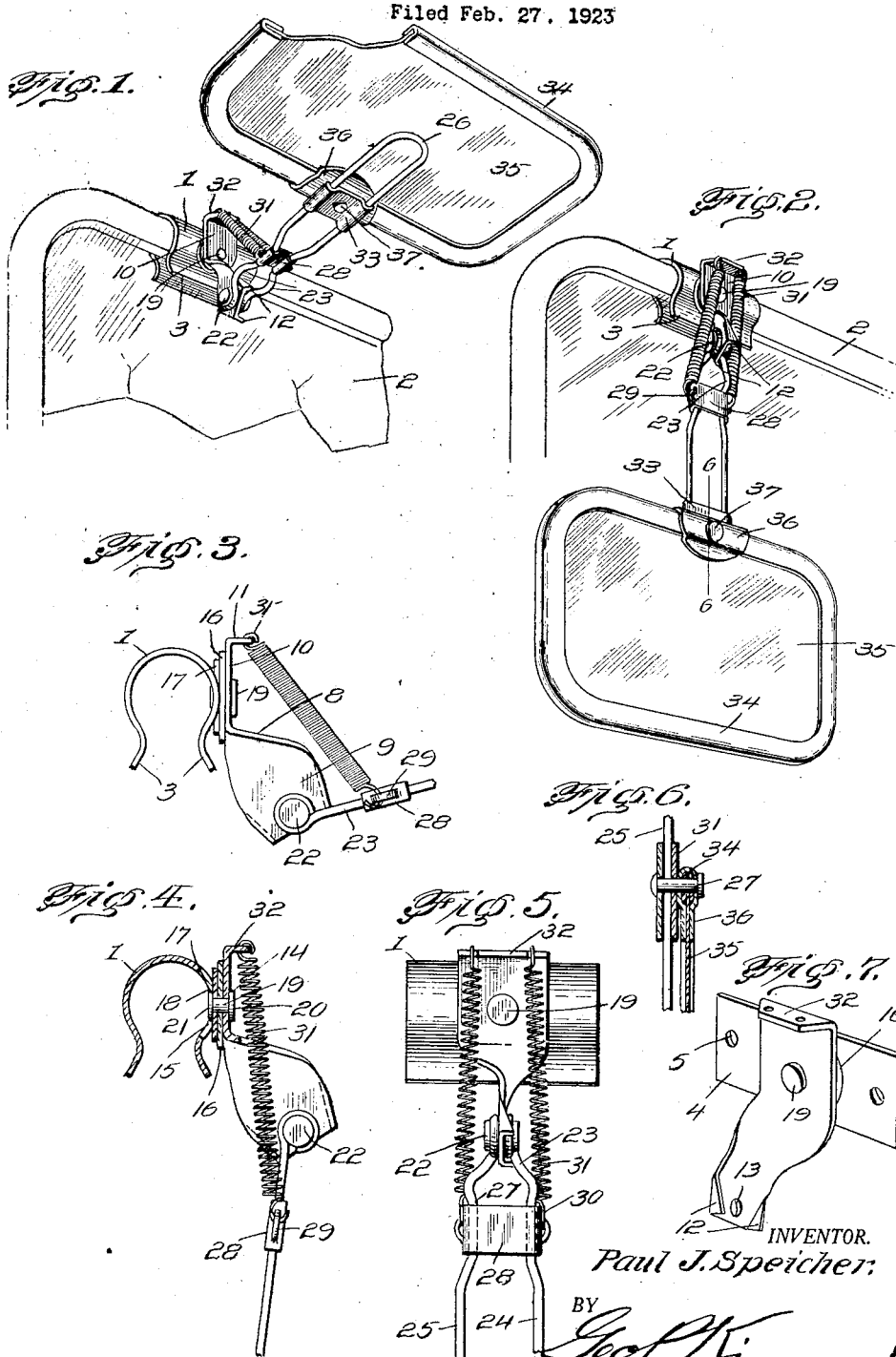

1,493,289

UNITED STATES PATENT OFFICE.

PAUL J. SPEICHER, OF GASTON, INDIANA.

GLARE SHIELD.

Application filed February 27, 1923. Serial No. 621,613.

*To all whom it may concern:*

Be it known that I, PAUL J. SPEICHER, a citizen of the United States, residing at Gaston, in the county of Delaware and State of Indiana, have invented certain new and useful Improvements in Glare Shields, of which the following is a specification.

This invention relates to a glare shield designed for use in connection with motor vehicles, and has for its object to provide in a manner as hereinafter set forth, a glare screen capable of being adjusted to any desired position for shielding the eyes of the driver of the vehicle against the blinding glare of the head lights of a vehicle approaching from the front.

A further object of the invention is to provide, in a manner as hereinafter set forth, a glare screen having means for connection with the wind shield of a vehicle or with the body of the vehicle and which can be easily operated to position the screen element in the line of vision of the driver to protect the eyes of the latter from the glare of head lights on approaching vehicles, or from the glare of the sun light, or from other reflected light rays.

Further objects of the invention are to provide a glare screen, in a manner as hereinafter referred to and which is simple in its construction and arrangement, strong, durable, thoroughly efficient in its use, conveniently positioned to and from operative position, readily set up, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a perspective view, broken away, of a wind shield showing the adaptation therewith of a glare screen in accordance with this invention, the screen being shifted to inoperative position.

Figure 2 is a view similar to Figure 1 with the glare screen shifted to operative position.

Figure 3 is a side elevation of the adjustable support for the screen element.

Figure 4 is a vertical sectional view of the adjustable support for the screen element and with the suspension members of said support shifted to position the screen element in inoperative position.

Figure 5 is a front view of the adjustable support for the screen element having the suspension members for the screen element shifted downwardly to maintain the screen element in operative position.

Figure 6 is a section on line 6—6, Figure 2.

Figure 7 is a detail illustrating a modified form of connection member for the adjustable support.

A glare screen in accordance with this invention includes a connecting member, an adjustable support and a screen element, and said adjustable support can be connected with the wind shield of a motor vehicle, or to the body of the vehicle and for such purpose the connecting member is employed and that form of connecting member which is used for attaching the adjustable support with the wind shield as illustrated in Figures 1 to 5, and the connecting member which is used for attaching the adjustable support to the body of the vehicle is shown in Figure 7. The connecting member shown in Figures 1 to 5 consists of a resilient clamp 1, positioned to overlap the top bar of the frame of the upper wind shield section 2, and such connecting member is formed from a single piece of resilient metallic material, bent to provide a cylindrical body portion formed with a pair of oppositely extending curved flanges 3, and which enables the connecting member to be quickly mounted in position on the wind shield, and the resiliency of the material from which the connecting member is constructed provides for an inherent gripping characteristic, so that the connecting member will snugly engage with the wind shield and under normal conditions remain stationary. The connecting member employed for attaching the adjustable support to the vehicle body, as shown in Figure 7, consists of a rectangular plate 4, provided with openings 5 through which extend holdfast devices, not shown, for detachably securing the plate 4 to the vehicle body.

The adjustable support consists of a body portion formed of a metallic strip torsionally twisted, intermediate its ends, as at 8, thereby providing a lower portion 9 and an upper portion 10 and with the lower portion 9 arranged to intersect centrally the plane of the upper portion 10. The torsionally twisted portion 8, as well as the lower portion 9, is disposed at an outward inclination with respect to the upper portion 10, and the latter at its top is provided with a forwardly extending right angularly disposed flange 11. The side edges of the lower portion 9 are bent at right angles to form a pair of stop flanges 12, 12′, for a purpose to be presently referred to, and said lower portion 9 is also formed with an opening 13.

The upper portion 10 has an opening 14, which registers with an opening 15, formed in a fiber washer 16, and said opening 15 registers with an opening 17 provided in a bearing portion 18, formed by slitting the connecting member 1, and offsetting the material freed by the slits with respect to the cylindrical part of the connecting member 1, and which is clearly shown in Figure 4. Extending through the registering openings 14, 15 and 17 is a pivot member 19, provided with a head at each end, as at 20, 21. The head 20 bears against the upper portion 10 of the body portion of the adjustable support and the head 21 bears against the inner face of the cylindrical portion of the connecting member 1. The pivot member 19 connects the body portion of the adjustable support with the connecting member and in a manner under normal conditions to prevent free shifting of the adjustable support, but the connection between the adjustable support and connecting member is such that the adjustable support can be shifted manually on the pivot member 19 when occasion so requires. The washer 16 acts as a frictional coupling between the adjustable support and the connecting member 1.

Mounted in the opening 13 is a pivot 22 upon each end of which, at each side of the lower portion 9 of the body portion of the adjustable support, is mounted the inset inner ends 23 of a pair of suspension arms 24, 25, which are connected together at their outer ends by an integral coupling piece 26. The arms 24, 25, are also inset as at 27 and secured to said inset portions 27, is a stay member 28, which is disposed transversely with respect to the arms 24, 25, as well as overlapping said arms. Each end of the stay member 28 has a lateral eye 29, and attached to each of the eyes 29, is the forward end 30 of a holding spring 31. The rear end of each of the holding springs 31, which is indicated at 32, is connected to the flange 11. The holding springs 31 are arranged at each side of the intermediate portion 8 and the lower portion 9 of the body portion of the adjustable support.

The flanges 12, 12′, cooperate with the inset portion 23 of the arm 24 for limiting the movement of the suspension arms when shifted from and to operative position. The downward movement of the suspension arms is limited by the engagement of the inset portion 23 of the arm 24 with the flange 12′, and the upward movement of the suspension arms is limited by the engagement of the inset portion 23 of the arm 24 with the flange 12.

The holding springs 31 perform two functions, one of which is to retain the suspension arms in inoperative position, and the other of which is to hold the suspension arms in operative position when shifted thereto. The inoperative position of the suspension arms is to hold the screen element, to be hereinafter referred to, in an elevated position above the wind shield and parallel to the top of the motor vehicle, and the operative position of the suspension arms is to hold the wind shield in position to protect the eyes of the driver.

The arms 24, 25, are so set up as to have a normal tendency to spread apart with respect to each other but such movement with respect to that part of the arms which extends from the inset portion 27 is controlled by a slide 33, which under normal conditions will remain in the position to which it has been adjusted, due to the frictional engagement of the slide with the arms 24, 25. The slide 33 adjustably supports the screen element and the latter consists of a frame 34, provided with a colored transparent panel 35, preferably green, although the panel 35 can be of any suitable color. Mounted on and overlapping the inner side of the frame 34, is a clasp 36, through which extends a pivot member 37, the latter is of a length to project through the frame 34 and slide 33, and provide means whereby the screen element can be angularly positioned with respect to the slide 33. The connection between the slide 33 and the screen element, is such, that under normal conditions the screen element will remain in the position to which it has been adjusted.

In Figure 7 of the drawings the body portion of the adjustable support is connected with the plate 4 by the pivot member 19, and interposed between the connecting plate 4 and the body portion of the adjustable support is a fiber washer 16.

The connection between the adjustable support and either connecting member, as well as the connection between the screen element and the slide 33, is a swivelled one, and by this arrangement the adjustable support can be shifted to any desired angular position with respect to the connecting member and the screen element can be shifted to any desired angular position with respect to the slide 33.

The connecting member 1 is employed when the device is used in connection with an open car, and the connecting member 4 employed when the device is used in connection with closed cars and either one of the connecting members provides means for suspending the adjustable support in the desired position so that when the screen element is not employed the latter can be shifted to a position parallel with the top of the vehicle, and when it is desired to employ the screen element, the latter can be shifted to a position to protect the eyes of the driver.

The slide 33 permits of the screen element to be shifted to any position with respect to the length of the suspension arms 24, 25, so that the screen element can be shifted to the position desired, and said screen element acts as a shade and the driver will place it between himself and the approaching lights and look under and to the side of it, and the driver can see through the screen element so that the approaching vehicle will be visible.

From the foregoing description taken in connection with the accompanying drawings, a glare screen is set up which can be adjusted to the desired position for the purpose of protecting the eyes of the driver of a vehicle, and although the preferred embodiment of the invention is as shown, yet changes in the details of construction can be had which will fall within the light of the invention as claimed.

What I claim is:—

1. A glare screen comprising an adjustable support, a pair of suspension elements having their inner ends pivotally connected with the lower end of said support and projecting forwardly therefrom, a slide mounted on and common to said pair of elements and further frictionally engaging with and adjustable lengthwise of said element, a screen element, means for pivotally connecting said screen element to said slide to provide for the angular adjustment of said screen element with respect to the slide, and a pair of holding springs connected to said suspension elements in proximity to the inner ends thereof and further connected with the upper end of said support for maintaining said suspension element in an elevated and in a lowered position when the screen is shifted respectively to inoperative and operative position.

2. A glare screen comprising an adjustable support, a pair of suspension elements having their inner ends pivotally connected with the lower end of said support, and projecting forwardly therefrom, a slide mounted on and common to said pair of elements and further frictionally engaging with and adjustable lengthwise of said element, a screen element, means for pivotally connecting said screen element to said slide to provide for the angular adjustment of said screen element with respect to the slide, a pair of holding springs connected to said suspension element in proximity to the inner ends thereof and further connected with the upper end of said support for maintaining said suspension element in an elevated and in a lowered position when the screen is shifted respectively to inoperative and operative position, and means formed integral with and disposed at right angles with respect to said adjustable support for limiting the elevating and lowering movements of said suspension element.

3. A glare screen comprising a connecting member, an angularly adjustable support including a body portion having its upper part disposed at an angle with respect to its lower part, means for swivelly connecting the upper part of said body portion to said connecting member, a pair of parallel elevating and lowering arms pivotally connected at their inner ends to the lower part of said body portion and further projecting therefrom, a slide common to and frictionally engaging said pair of arms and further shiftable lengthwise with respect thereto, a screen element pivotally connected to and angularly adjustable upon said slide, and a pair of holding springs connected at their upper ends to the top of the upper part of said body portion and at their lower ends to said arms outwardly with respect to the pivoted ends of said arms and providing means for holding said arms in an elevated and a lowered position.

4. A glare screen comprising a connecting member, an angularly adjustable support including a body portion having its upper part disposed at an angle with respect to its lower part, means for swivelly connecting the upper part of said body portion to said connecting member, a pair of parallel elevating and lowering arms pivotally connected at their inner ends to the lower part of said body portion and further projecting therefrom, a slide common to and frictionally engaging said pair of arms and further shiftable lengthwise with respect thereto, a screen element pivotally connected to and angularly adjustable upon said slide, a pair of holding springs connected at their upper ends to the top of the upper part of said body portion and at their lower ends to said arms outwardly with respect to the pivoted ends of said arms and providing means for holding said arms in an elevated and a lowered position, and said body portion having its lower part provided with integral and right angularly disposed means for limiting the elevating and lowering movement of said arms.

In testimony whereof, I affix my signature hereto.

PAUL J. SPEICHER.